US009444704B2

(12) United States Patent
Nakajima et al.

(10) Patent No.: US 9,444,704 B2
(45) Date of Patent: Sep. 13, 2016

(54) METHOD FOR CONTROLLING MONITORING ITEMS, MANAGEMENT COMPUTER, AND COMPUTER SYSTEM IN CLOUD SYSTEM WHERE VIRTUAL ENVIRONMENT AND NON-VIRTUAL ENVIRONMENT ARE MIXED

(71) Applicant: HITACHI, LTD., Tokyo (JP)

(72) Inventors: Noriko Nakajima, Tokyo (JP); Akihisa Nagami, Tokyo (JP); Toshio Otani, Tokyo (JP); Atsumi Terayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/240,484

(22) PCT Filed: May 20, 2013

(86) PCT No.: PCT/JP2013/063888
§ 371 (c)(1),
(2) Date: Feb. 24, 2014

(87) PCT Pub. No.: WO2014/188478
PCT Pub. Date: Nov. 27, 2014

(65) Prior Publication Data
US 2016/0072687 A1 Mar. 10, 2016

(51) Int. Cl.
*G06F 15/173* (2006.01)
*H04L 12/26* (2006.01)
(Continued)

(52) U.S. Cl.
CPC ............. *H04L 43/08* (2013.01); *G06F 11/301* (2013.01); *G06F 11/3006* (2013.01);
(Continued)

(58) Field of Classification Search
CPC ....... H04L 43/04; H04L 43/08; H04L 41/12; H04L 12/2602; G06F 9/45533; G06F 9/45558; G06F 11/3055; G06F 2201/865; G06F 3/0653
USPC .......................................... 709/213, 223–225
See application file for complete search history.

(56) References Cited

U.S. PATENT DOCUMENTS 9,063,525 B2 * 6/2015 Sanders .................. G05B 11/01
2005/0223220 A1 * 10/2005 Campbell ........... G06F 9/45537
713/164

(Continued)

FOREIGN PATENT DOCUMENTS

EP          0480546 A2 *  4/1992   ......... G06F 12/1491
JP       2007-272263 A   10/2007
(Continued)

*Primary Examiner* — Oanh Duong
(74) *Attorney, Agent, or Firm* — Mattingly & Malur, PC

(57) ABSTRACT

In a cloud environment that provides both virtual environment and non-virtual environment, in order to address a problem in that monitoring items that vary depending on usage cases must be managed, the present invention proposes a management method in which whether each server brings about a virtual environment or a non-virtual environment is managed by performing registration processing in cooperation with image management and a service resource registration task. In addition, user manager monitoring profile item management information for virtual/no-virtual environment is prepared, and with reference to this information, calculation methods, which specify monitoring items to be monitored out of monitoring items and infra monitoring items for each environment, are managed. With the use of these calculation methods, a user manager and an infrastructure manager may perform optimal monitorings.

18 Claims, 21 Drawing Sheets

(51) Int. Cl.
*G06F 11/30* (2006.01)
*H04L 12/24* (2006.01)
*H04L 29/08* (2006.01)
*G06F 11/34* (2006.01)

(52) U.S. Cl.
CPC ...... *G06F 11/3055* (2013.01); *G06F 11/3409* (2013.01); *H04L 41/08* (2013.01); *H04L 67/10* (2013.01); *G06F 11/3495* (2013.01); *G06F 2201/815* (2013.01)

(56) References Cited

U.S. PATENT DOCUMENTS

| | | | | |
|---|---|---|---|---|
| 2007/0226795 A1* | 9/2007 | Conti | ...................... | G06F 21/74 726/22 |
| 2007/0233838 A1 | 10/2007 | Takamoto et al. | | |
| 2008/0162770 A1* | 7/2008 | Titiano | .................. | G06F 1/3203 710/309 |
| 2009/0049220 A1* | 2/2009 | Conti | ...................... | G06F 13/24 710/267 |
| 2009/0157936 A1* | 6/2009 | Goss | ..................... | G06F 1/3203 710/264 |
| 2010/0076993 A1* | 3/2010 | Klawitter | .......... | G06F 17/30905 707/769 |
| 2010/0312893 A1 | 12/2010 | Watanabe et al. | | |
| 2011/0010634 A1 | 1/2011 | Hatasaki et al. | | |
| 2011/0307696 A1* | 12/2011 | Masuda | .............. | H04L 63/0823 713/168 |
| 2012/0102103 A1* | 4/2012 | Jacobson | ............... | G06F 9/5072 709/204 |
| 2012/0226740 A1* | 9/2012 | Nath | .................... | H04L 67/125 709/203 |
| 2013/0287036 A1* | 10/2013 | Banavalikar | ............ | H04L 45/00 370/401 |
| 2013/0297802 A1* | 11/2013 | Laribi | ..................... | H04L 47/80 709/226 |
| 2014/0012595 A1* | 1/2014 | Fox | ..................... | G06F 19/3425 705/2 |
| 2014/0074821 A1* | 3/2014 | Bailey | ..................... | G09G 5/00 707/722 |

FOREIGN PATENT DOCUMENTS

| | | | |
|---|---|---|---|
| JP | 2010-282420 A | 12/2010 | |
| JP | 2011-018198 A | 1/2011 | |
| JP | 2012-088943 A | 5/2012 | |
| JP | WO 2014128948 A1 * | 8/2014 | ......... H04L 12/4641 |

* cited by examiner

MANAGEMENT COMPUTER

SELF-SERVICE PORTAL

FIG.4

VIRTUAL/NON-VIRTUAL MANAGEMENT INFORMATION

| PHYSICAL SERVER IDENTIFICATION INFORMATION | VIRTUALIZATION BASE/OS | | VIRTUAL/NON -VIRTUAL STATUS |
|---|---|---|---|
| | TYPE | ATTRIBUTE | |
| A_01 | UNASSIGNED | UNASSIGNED | UNASSIGNED |
| A_02 | HYPERVISOR A | RESOURCE POOL | VIRTUAL |
| B_02 | HYPERVISOR B | SERVICE RESOURCE | NON-VIRTUAL |
| ... | ... | ... | ... |

FIG. 5

INFRASTRUCTURE MONITORING ITEM MANAGEMENT INFORMATION (1)

| MONITORING TARGET | TYPE | MONITORING ITEM |
|---|---|---|
| SERVER | RUNNING INFORMATION | POWER SUPPLY CONDITION |
| | | HEALTH STATUS |
| | SPECIFICATION | NUMBER OF CPU CORES |
| | | MEMORY CAPACITY |
| | | DISK CAPACITY |
| | USE STATUS | CPU USE RATE |
| | | FILE SYSTEM USE RATE |
| | HARDWARE INFORMATION | SERIAL NUMBER |
| | | HOST NAME |
| | | MAC ADDRESS |
| | | CLUSTER INFORMATION |
| | | CHASSIS INFORMATION |
| | | POWER USE STATUS |
| | | FAN MODULE CONDITION |
| STORAGE | RUNNING INFORMATION | POWER SUPPLY CONDITION |
| | | HEALTH STATUS |
| | SPECIFICATION | STORAGE TYPE |
| | | DISK TYPE |
| | USE STATUS | PHYSICAL DISK USE RATE |
| | | POOL USE RATE |
| | | LOGICAL UNIT USE RATE |
| | | PORT PROCESSOR USE RATE |
| | HARDWARE INFORMATION | SERIAL NUMBER |
| | | POWER USE STATUS |
| | | DRIVE INFORMATION |
| | | FAN MODULE CONDITION |
| ... | ... | ... |

FIG. 6
INFRASTRUCTURE MONITORING ITEM MANAGEMENT INFORMATION (2)

| MONITORING TARGET | TYPE | MONITORING ITEM |
|---|---|---|
| OS/VIRTUALIZATION ENVIRONMENT | RUNNING INFORMATION | HYPERVISOR RUNNING STATUS |
| | | FILE SYSTEM CONNECTION STATUS |
| | | VLAN CONNECTION STATUS |
| | HOST INFORMATION | HOST NAME |
| | | NUMBER OF CPU CORES |
| | | MEMORY CAPACITY |
| | VIRTUAL MACHINE INFORMATION | VIRTUAL MACHINE NAME |
| | | CPU USE RATE PER VIRTUAL MACHINE |
| | | MEMORY CAPACITY PER VIRTUAL MACHINE |
| | | VIRTUAL DISK CAPACITY |
| | IMAGE INFORMATION | IMAGE NAME |
| | | PACKAGE NAME |
| | | USE CONDITION |
| | TEMPLATE INFORMATION | OS NAME |
| | | sysprep INFORMATION |
| | USE STATUS | CPU USE RATE |
| | | FILE SYSTEM CAPACITY |
| | | FILE SYSTEM USE RATE |
| | HARDWARE INFORMATION | LOGICAL UNIT INFORMATION |
| | | DISK TYPE |
| | | CLUSTER INFORMATION |
| ... | ... | ... |

FIG. 7

USER MANAGER MONITORING ITEM MANAGEMENT INFORMATION 10031    10032    10033    10034    1003

| MONITORING ITEM MANAGEMENT IDENTIFICATION INFORMATION | VIRTUAL/ NON-VIRTUAL STATUS | DISPLAY ITEM | | RELEVANT INFRASTRUCTURE MONITORING ITEM |
|---|---|---|---|---|
| VIRTUAL ENVIRONMENTAL PATTERN | VIRTUAL | SERVER IDENTIFICATION INFORMATION | | SERIAL NUMBER OR HOST NAME OR MAC ADDRESS |
| | | RUNNING CONDITION | RUNNING | HYPERVISOR RUNNING INFORMATION =ON AND FILE SYSTEM CONNECTION INFORMATION=ON |
| | | | NOT RUNNING | HYPERVISOR RUNNING INFORMATION =OFF OR FILE SYSTEM CONNECTION INFORMATION=OFF |
| | | USE STATUS | CPU USE RATE | CPU USE RATE |
| | | | FILE SYSTEM FREE CAPACITY | FILE SYSTEM CAPACITY* (1−FILE SYSTEM USE RATE) |
| | | VIRTUAL COMPUTER INFORMATION | COMPUTER IDENTIFICATION INFORMATION | VIRTUAL MACHINE NAME |
| | | | MEMORY CAPACITY | MEMORY CAPACITY PER VIRTUAL MACHINE |
| | | | VIRTUAL DISK CAPACITY | VIRTUAL DISK CAPACITY |
| | | AVAILABLE TEMPLATE IDENTIFICATION INFORMATION | | OS NAME, sysprep INFORMATION |
| NON-VIRTUAL ENVIRONMENTAL PATTERN | NON-VIRTUAL | SERVER IDENTIFICATION INFORMATION | | SERVER NAME |
| | | RUNNING INFORMATION | RUNNING | POWER SUPPLY CONDITION=ON AND NETWORK RUNNING CONNECTION STATUS=ON |
| | | | NOT RUNNING | POWER SUPPLY CONDITION=OFF OR NETWORK RUNNING CONNECTION STATUS=OFF |
| | | SPECIFICATION | NUMBER OF CPU CORES | NUMBER OF CPU CORES |
| | | | MEMORY CAPACITY | MEMORY CAPACITY |
| | | | DISK CAPACITY | DISK CAPACITY |
| | | | DISK TYPE | DISK TYPE, POOL TYPE |
| | | AVAILABLE IMAGE IDENTIFICATION INFORMATION | | IMAGE NAME, PACKAGE NAME, USE STATUS |

FIG. 8

IMAGE MANAGEMENT INFORMATION

| PHYSICAL SERVER IDENTIFICATION INFORMATION | IMAGE IDENTIFICATION INFORMATION |
|---|---|
| B_02 | SERVER 2008 DC |
| ... | ... |

FIG. 9

MONITORING PATTERN MANAGEMENT INFORMATION

| SERVER SERVICE IDENTIFICATION INFORMATION 10051 | SERVER IDENTIFICATION INFORMATION 10052 | MONITORING ITEM MANAGEMENT IDENTIFICATION INFORMATION 10053 |
|---|---|---|
| SERVER 01 | B_02 | VIRTUAL ENVIRONMENTAL PATTERN 1 |
| ... | | ... |

SERVICE MANAGEMENT INFORMATION

| SERVICE IDENTIFICATION INFORMATION | SERVER INFRASTRUCTURE IDENTIFICATION INFORMATION | SERVER USER |
|---|---|---|
| SERVER 1 | B_02 | USER A |
| SERVER 2 | | USER B |

MONITORING INFORMATION FOR VIRTUAL ENVIRONMENT

| SERVER IDENTIFICATION INFORMATION (20021) | RUNNING CONDITION (20022) | USE STATUS | | VIRTUAL COMPUTER INFORMATION (2002) | | |
|---|---|---|---|---|---|---|
| | | CPU USE RATE (20025) | FILE SYSTEM FREE CAPACITY (20026) | VIRTUAL COMPUTER IDENTIFICATION INFORMATION (20027) | MEMORY CAPACITY (20028) | VIRTUAL DISK CAPACITY (20029) |
| SERVER 1 | RUNNING | 30% | 500GB | VM1 | 1GB | 50GB |
| | | | | VM2 | 500MB | 30GB |
| SERVER 2 | RUNNING | 10% | 200GB | VM1 | 1GB | 100GB |

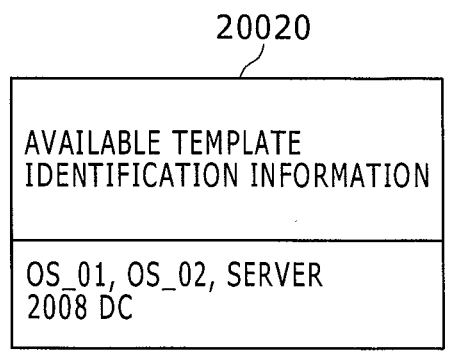

20020

AVAILABLE TEMPLATE IDENTIFICATION INFORMATION

OS_01, OS_02, SERVER 2008 DC

FIG.12

MONITORING INFORMATION FOR NON-VIRTUAL ENVIRONMENT

| SERVER IDENTIFICATION INFORMATION | RUNNING CONDITION | USED IMAGE | SPECIFICATION | | | |
|---|---|---|---|---|---|---|
| | | | NUMBER OF CPU CORES | MEMORY CAPACITY | DISK CAPACITY | DISK TYPE |
| SERVER 1 | RUNNING | UNASSIGNED | 4 | 4GB | 1TB | SSD |
| SERVER 2 | RUNNING | OS_A | 8 | 16GB | 1TB | HDT |

| AVAILABLE IMAGE IDENTIFICATION INFORMATION |
|---|
| OS_A.iso, Server 2008 DC.iso |

LOGICAL CONFIGURATION OF SERVICE RESOURCE AND RESOURCE POOL

VIRTUAL/NON-VIRTUAL MANAGEMENT PROCESSING
(2)(SERVICE RESOURCE REGISTRATION PROCESSING)

USER MANGER MONITORING INFORMATION DISPLAY PROCESSING

USER MANGER MONITORING INFORMATION ACQUISITION PROCESSING

FIG.19

SERVICE MANAGEMENT INFORMATION
(SECOND EMBODIMENT)

| SERVER USER | CLUSTER IDENTIFICATION INFORMATION | SERVER IDENTIFICATION INFORMATION | DISK INFORMATION | | |
| --- | --- | --- | --- | --- | --- |
| | | | IDENTIFICATION INFORMATION | CAPACITY | TYPE |
| USSER A | CLUSTER 1 | SERVER 1, SERVER 2 | VOLUME 1 | 50GB | DP |
| | | | VOLUME 2 | 1TB | DT |
| | | | VOLUME 3 | 100GB | SSD |
| USSER B | | | | | |

FIG.20

USER MANAGER MONITORING ITEM MANAGEMENT INFORMATION
(SECOND EMBODIMENT)

| MONITORING ITEM MANAGEMENT IDENTIFICATION INFORMATION (10031) | VIRTUAL/ NON-VIRTUAL STATUS (10032) | DISPLAY ITEM (10033) | | RELEVANT INFRASTRUCTURE MONITORING ITEM (10034) |
|---|---|---|---|---|
| VIRTUAL ENVIRONMENTAL PATTERN | VIRTUAL | SERVER IDENTIFICATION INFORMATION | | SERIAL NUMBER OR HOST NAME OR MAC ADDRESS |
| | | CLUSTER IDENTIFICATION INFORMATION | | CLUSTER INFORMATION |
| | | DISK INFORMATION | | DISK TYPE, CAPACITY |
| | | RUNNING CONDITION | RUNNING | HYPERVISOR RUNNING INFORMATION = ON AND FILE SYSTEM CONNECTION INFORMATION=ON |
| | | | NOT RUNNING | HYPERVISOR RUNNING INFORMATION = OFF OR FILE SYSTEM CONNECTION INFORMATION=OFF |
| | | USE STATUS | CPU USE RATE | CPU USE RATE |
| | | | FILE SYSTEM FREE CAPACITY | FILE SYSTEM CAPACITY* (1−FILE SYSTEM USE RATE) |
| | | VIRTUAL COMPUTER INFORMATION | COMPUTER IDENTIFICATION INFORMATION | VIRTUAL MACHINE NAME |
| | | | MEMORY CAPACITY | MEMORY CAPACITY PER VIRTUAL MACHINE |
| | | | VIRTUAL DISK CAPACITY | VIRTUAL DISK CAPACITY |
| | | TEMPLATE INFORMATION | | OS NAME, sysprep INFORMATION |

1003

INFRASTRUCTURE MANAGER MONITORING ITEM CONFIGURATION PROCESSING
(THIRD EMBODIMENT)

METHOD FOR CONTROLLING MONITORING ITEMS, MANAGEMENT COMPUTER, AND COMPUTER SYSTEM IN CLOUD SYSTEM WHERE VIRTUAL ENVIRONMENT AND NON-VIRTUAL ENVIRONMENT ARE MIXED

BACKGROUND

The present invention relates to computer systems including servers, switches, and storages, and management technologies. More particularly, the present invention relates to monitoring technologies used in an environment where virtual objects and non-virtual (physical) objects are mixed.

In the operation of a cloud system, it is indispensable to provide appropriate monitoring information for an infrastructure manager and users of a cloud infrastructure system. In the case of IaaS (Infrastructure as a Service) where infrastructures are provided via a network, resources are classified into resources that belong to Resource Pool that is provided for infrastructure managers and resources that belong to Service Resource that is provided for IaaS users (user managers). Conventionally, because virtual computers are usually provided for end-users, it is typical that virtual environments are provided for Service Resource.

As a monitoring technology used in such an environment, for example, Japanese Unexamined Patent Application Publication No. 2011-018198 discloses a technology in which an optimal resource is assigned from Resource Pool through monitoring load status including a CPU usage rate and the like.

SUMMARY

In a cloud environment, in order to accomplish a highly effective business, a service that provides a non-virtual environment (used as a synonym of a physical environment or a bare metal environment) in addition to a virtual environment is required. A user manager who uses a virtual environment creates a virtual computer in a cloud environment provided for him/her, and provides the virtual computer for an end-user. On the other hand, a user manager who uses a non-virtual environment deploys an OS environment that runs in a cloud environment (that is, carries out bare metal deployment) on his/her own, and develops, for example, a virtualization base, and a database server. Because the usage case and intended purpose of the virtual environment are different from those of the non-virtual environment, items to be monitored for the virtual environment are different from those to be monitored for the non-virtual environment.

In order to provide such a cloud system as above, a technology to monitor a mixed virtual/non-virtual environment is required.

Although, in the related infrastructure management technology, monitoring is performed with the use of an IPMI (Intelligent Platform Management Interface), this technology cannot judge whether the current OS belongs to Service Resource or to Resource Pool, and therefore information regarding virtual and non-virtual objects cannot be obtained. As a result, the relevant infrastructure manager or the relevant user manager cannot manage monitoring items individually. Therefore, in order that a system, in which monitoring items can be individually managed, may be materialized with the use of the related technology, extra man-hours, such as man-hours for obtaining all the parameters obtainable from the system, for giving an undue load on the system, and for configuring monitoring items individually for each user, are needed, which causes a problem in that the management cost increases.

A management computer manages the attribute of a hypervisor and the attribute of OS through checking whether the attribute of the hypervisor or the attribute of the OS belongs to Resource Pool or Service Resource in cooperation with image management or a service resource registration task.

In addition, the management computer manages a virtual environmental profile and a non-virtual environmental profile.

In the virtual environmental profile, the management computer sets a hypervisor running status, a memory capacity, a file system free capacity, and a virtual machine running status to be monitoring items, so that a user manager can obtain items necessary to deploy a virtual computer. In the non-virtual environmental profile, the management computer sets the running status, specifications, and the like of a physical computer (physical server) to be monitoring items, so that a user manager can obtain items necessary to perform bare metal deployment, and to run the OS and the hypervisor.

If the above attribute belongs to Resource Pool, the management computer judges that a virtual environment is provided for the user manager, configures monitoring items on the basis of the virtual monitoring profile, and configures items for virtual environment in monitoring information for the user manager. The above items are obtained via the management computer. In addition, if the above attribute belongs to Service Resource, the management computer judges that a non-virtual environment is provided for the user manager, configures monitoring items on the basis of the non-virtual monitoring profile, and configures items for non-virtual environment in monitoring information for the user manager. The above items are obtained via the management computer.

As described above, in a cloud system where the virtual environment and the non-virtual environment are mixed, the user manager and an infrastructure manager can perform optimal monitorings, which leads to the decrease in management cost.

BRIEF DESCRIPTION OF THE DRAWINGS

FIG. 4 is a conceptual diagram showing an example of virtual/non-virtual management information;

FIG. 5 is a conceptual diagram showing an example of infrastructure monitoring item management information;

FIG. 6 is a conceptual diagram showing an example of infrastructure monitoring item management information;

FIG. 7 is a conceptual diagram showing an example of user manager monitoring item management information;

FIG. 8 is a conceptual diagram showing an example of image management information;

FIG. 9 is a conceptual diagram showing an example of monitoring pattern management information;

FIG. 10 is a conceptual diagram showing an example of service management information;

FIG. 11 is a conceptual diagram showing an example of monitoring information for virtual environment;

FIG. 12 is a conceptual diagram showing an example of monitoring information for non-virtual environment;

FIG. 19 is a conceptual diagram showing an example of service management information;

FIG. 20 is a conceptual diagram showing an example of user manager monitoring item management information.

DETAILED DESCRIPTION

Figure 1:
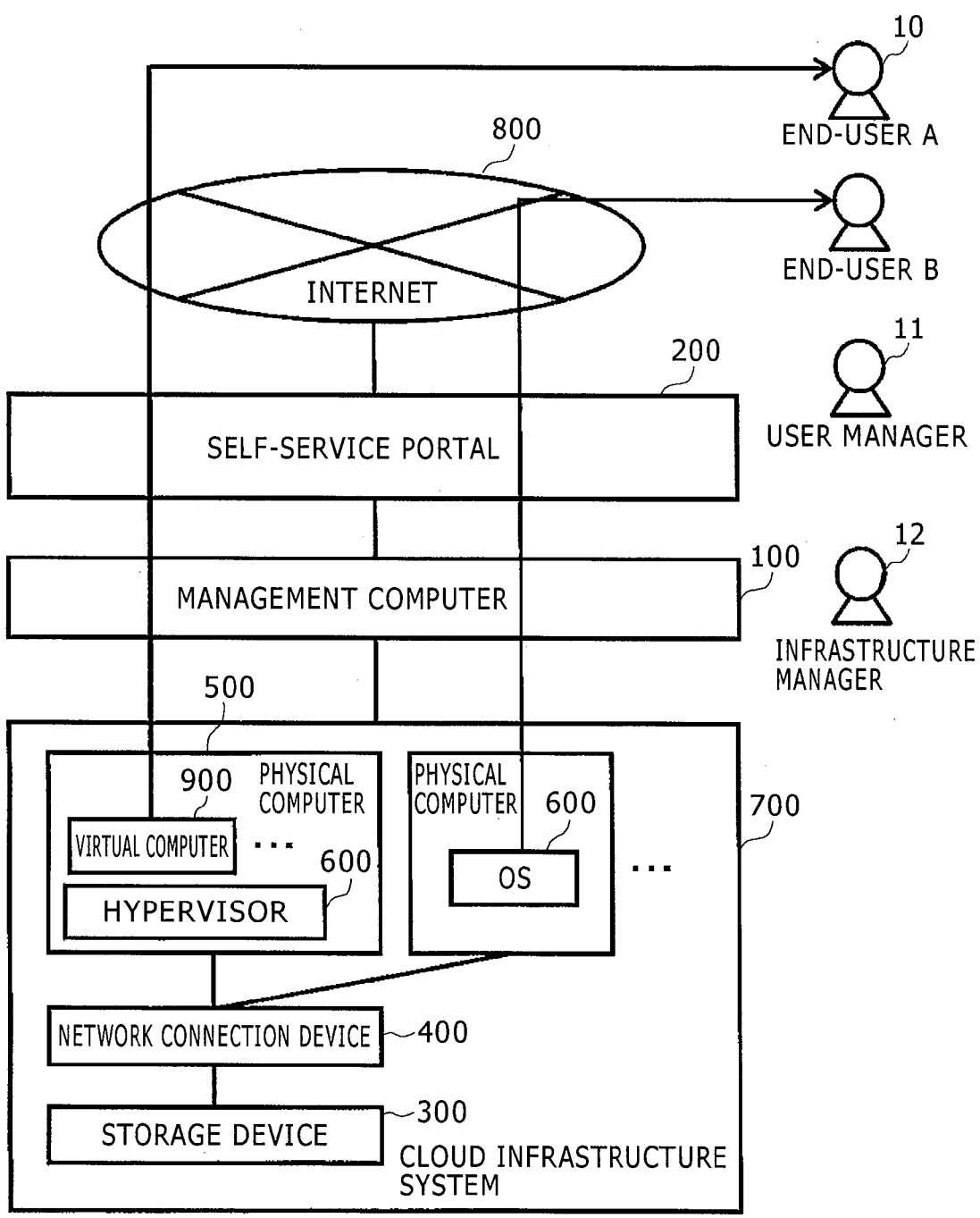
FIG. 1 is a block diagram showing the entire configuration of a cloud system.

Hereinafter, the present invention will be described with reference to the accompanying drawings. In the following embodiments, because components, which have the same structures and to which the same reference numerals are attached, essentially operate in the same manner, the redundant descriptions about the components will be accordingly omitted.

First Embodiment

FIG. 1 shows a block diagram of a cloud system. A cloud service the present invention intends to deal with is a service for a user manager 11, and the user manager is provided with an environment including a hypervisor and OS (virtual environment), or a bare metal environment (non-virtual environment) from a cloud infrastructure system 700. In the case where the user manager is provided with the virtual environment, the user manager deploys a virtual computer 900 via a self-service portal 200 and assigns the virtual computer 900 to an end user 10 via the Internet 800. In the case where the user manager is provided with the non-virtual environment, the user manager deploys a physical computer 500 including OS via the self-service portal 200 and assigns the physical computer 500 to the end user 10 via the Internet 800.

The cloud infrastructure system is an infrastructure that provides a cloud service, and includes physical computers 500, a network device 400, and a storage device 300. The hypervisor and the OS 600, of which a virtual service is comprised, run on the physical computers, and the virtual computer 200 runs on the hypervisor. An infrastructure manager 12 monitors or tunes the cloud infrastructure system with the use of the management computer 100.

In addition, it is conceivable that the cloud infrastructure system is comprised of several vertically-integrated systems each of which includes physical computers, a network connection device, and a storage device in one physical chassis. In addition, it is also conceivable that the manager computer 100, the self-service portal 200, and the cloud infrastructure system 700 are coupled to each other via the Internet 800.

Figure 2:
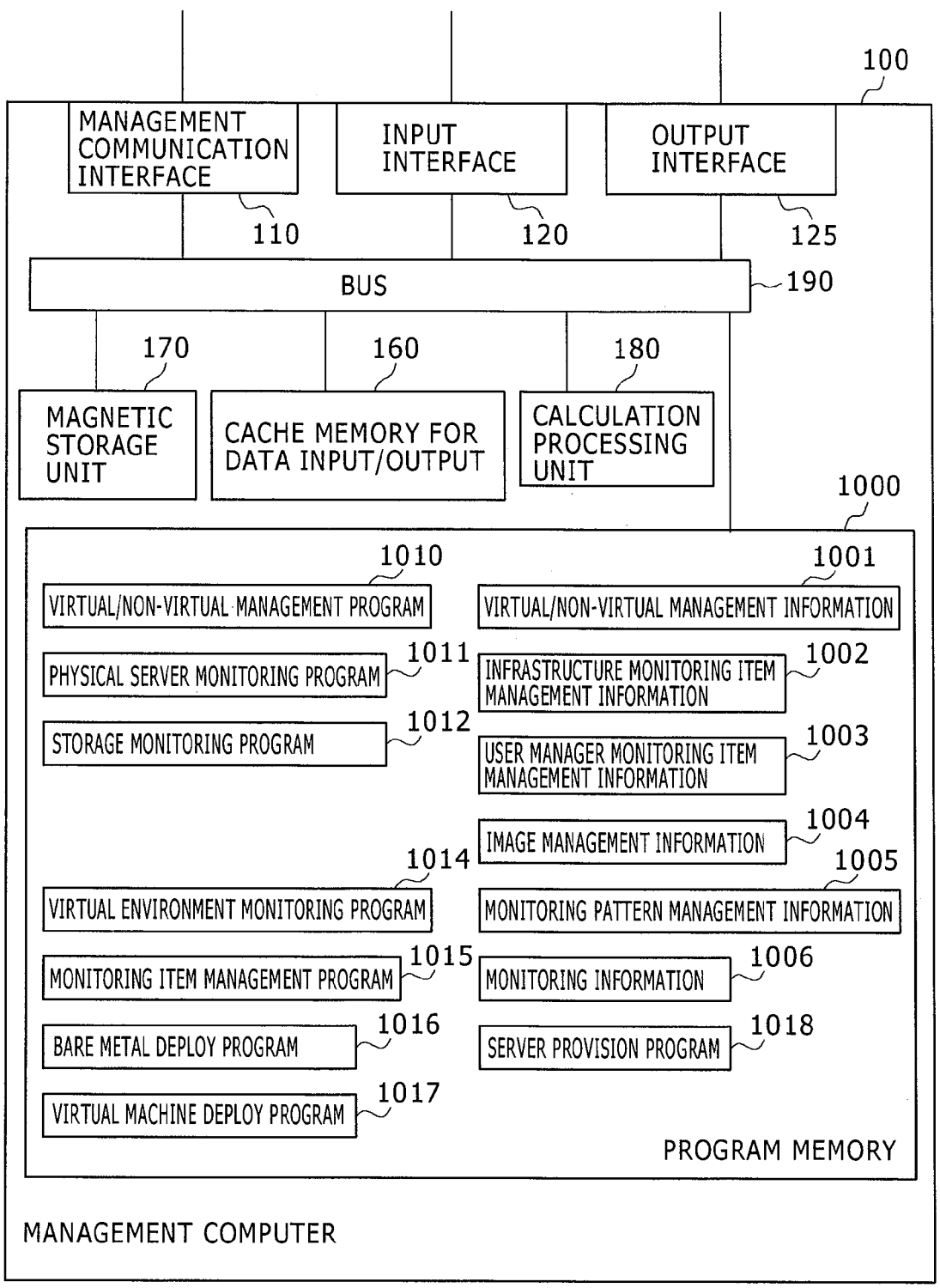
FIG. 2 is a block diagram showing the configuration of a management computer.

FIG. 2 shows an example of the configuration of the management computer 100. The management computer 100 is used for storing configuration information and programs for the infrastructure manager to manage the cloud infrastructure.

The management computer 100 is configured in such a way that a management communication interface 110 that is coupled to a management network and used for the input and output of management information, an input interface 120 used for an operator to input information such as a keyboard or a mouse, an output interface 125 used to bring about information to the operator such as a general-purpose display, a calculation processing unit 180 that is equivalent to a CPU for carrying out various calculations, a magnetic storage unit 170 that stores plural pieces of fundamental software such as operating systems and applications, and a program memory 1000 that is a memory space for storing programs necessary to activate the management computer 100 are coupled to each other via a communication bus 190. In other words, the hardware configuration of the management computer 100 shown by this example can be materialized by a general-purpose computer (PC).

The program memory 1000 is a memory space materialized by installing the magnetic storage unit and volatile semiconductor memories, and used for storing the fundamental programs and information necessary to activate the management computer 100. The control information and control programs stored in the program memory 1000 includes: virtual/non-virtual management information 1001; infrastructure monitoring item management information 1002; user manager monitoring item management information 1003; image management information 1004; monitoring pattern management information 1005; monitoring information 1006; a virtual/non-virtual management program 1010; a physical server monitoring program 1011; a storage monitoring program 1012; a virtual environment monitoring program 1014; a monitoring item management program 1015; a bare metal deploy program 1016; a virtual machine deploy program 1017; and a server provision program 1018. The detail of the control information will be described later.

The virtual/non-virtual management program 1010 is a program that judges which environment a computer brings about, a virtual environment or a non-virtual environment. The physical server monitoring program 1011 is a program that monitors the serial number, power supply condition, a CPU usage rate, a memory capacity, and the like of the physical server. The storage monitoring program 1012 is a program that monitors the conditions of a physical disk and a RAID group, the condition of a logical disk, the usage status of a storage port. The virtual environment monitoring program 1014 is a program that monitors the infrastructure of a hypervisor layer. The monitoring item management program 1015 is a program that judges whether a service resource member is virtual or non-virtual, and configures the monitoring items for the user manager. The bare metal deploy program 1016 is a program that assigns an image corresponding to a bare metal server on the basis of a deploy request from the user manager. The virtual machine deploy program 1017 is a program that deploys a virtual machine on the basis of the deploy request from the user manager. The server provision program 1018 is a program that receives a service start request from the self-service portal, and registers a server in Service Resource.

In addition, the monitoring information 1006 manages monitoring information obtained from 1011, 1012, and 1014.

Figure 3:
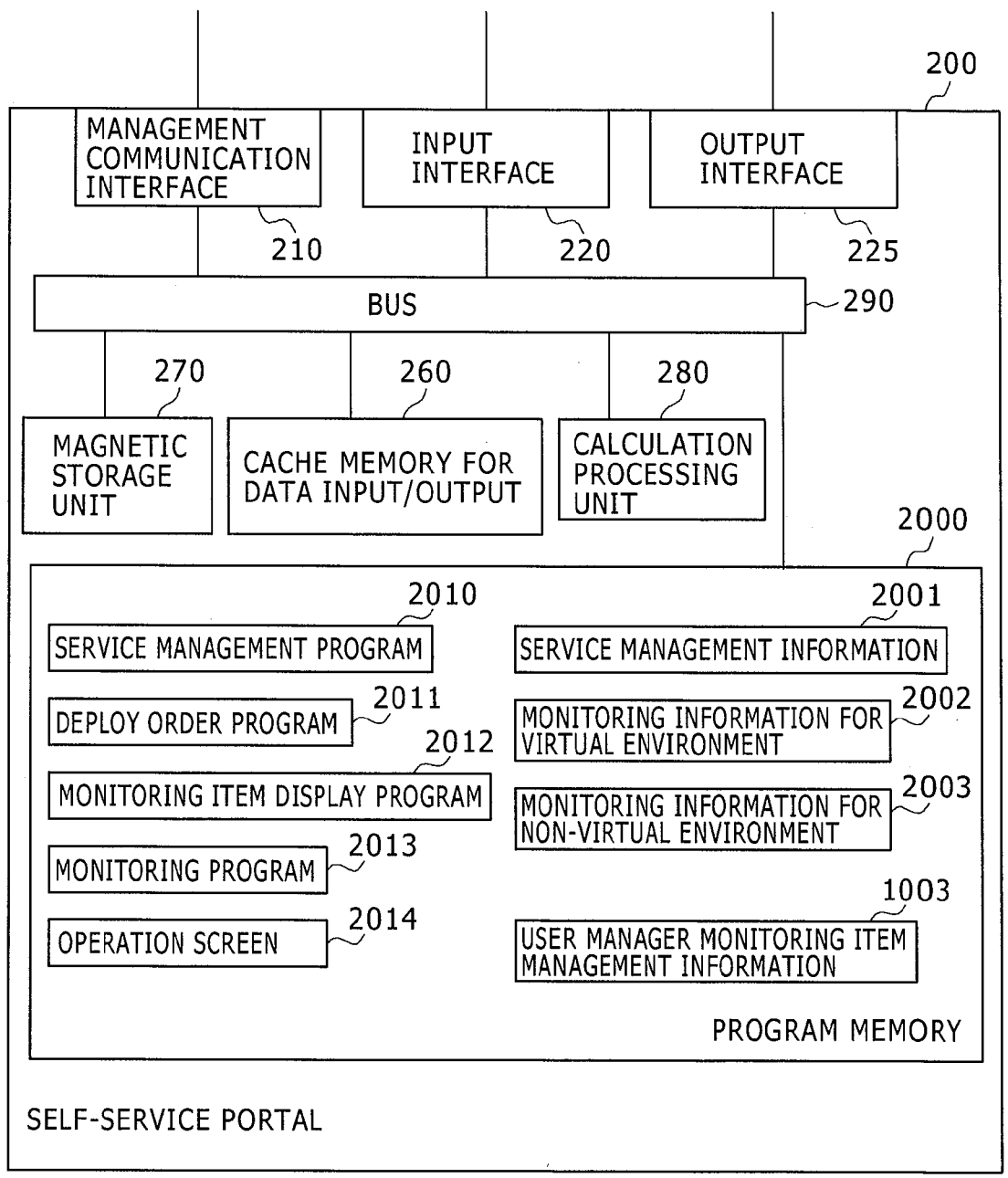
FIG. 3 is a block diagram showing the configuration of a self-service portal.

FIG. 3 shows a configuration example of the self-service portal 200. The self-service portal 200 is a computer that stores configuration information and programs for the user manager to perform the deployment of a virtual computer and a bare metal server. In fact, the user manager accesses the self-service portal via a network, and information from the self-service portal is displayed on the computer the user manager operates.

The self-service portal 200 is configured in such a way that a management communication interface 210 that is coupled to the management network and used for the input and output of management information, an input interface 220 used for an operator to input information such as a keyboard or a mouse, an output interface 225 used to bring about information to the operator such as a general-purpose display, a calculation processing unit 280 that is equivalent to a CPU for carrying out various calculations, a magnetic storage unit 270 that stores plural pieces of fundamental software such as operating systems and applications, and a program memory 2000 that is a memory space for storing programs necessary to activate the self-service portal 200 are coupled to each other via a communication bus 290.

In other words, the hardware configuration of the self-service portal 200 shown by this example can be materialized by a general-purpose computer (PC).

The program memory 2000 is a memory space materialized by installing the magnetic storage unit and semiconductor memories, and used for storing the fundamental programs and information necessary to activate the management computer 200. The control information and control programs stored in the program memory 2000 includes: service management information 2001; monitoring information for virtual environment 2002; monitoring information for non-virtual environment 2003; a service management program 2010; a deploy order program 2011; a monitoring item display program 2012; a monitoring program 2013; and an operation screen 2014. The detail of the control information will be described later.

The service management program 2010 is a program that registers a server in Service Resource and provides the user manager with a virtual or non-virtual environment. The monitoring program 2013 is a monitoring program that monitors a hypervisor layer or an OS layer that introduced by a user after bare metal deployment in the case where a non-virtual environment is provided to Service Resource. The deploy order program 2011 is a program that designates a virtual server, a template, a CPU and a disk capacity of the virtual machine, and orders the management computer to perform the deployment of the virtual machine in the case where a virtual environment is provided to Service Resource. In the case where a virtual environment is provided to the Service Resource, the deploy order program 2011 designates an image, and orders the management computer to perform bare metal deployment. The monitoring item display program 2012 is a program that requests the management computer to display monitoring information, and displays monitoring items designated by the management computer. While the monitoring program 2013 is introduced by the user manager, the monitoring item display program 2012 displays the monitoring items on the basis of user monitoring management items obtained from the management computer.

FIG. 4 is a diagram showing a configuration example of the virtual/non-virtual management information 1001 stored by the management computer. This management information manages a hypervisor or OS that is introduced into a physical server listed in the column physical server identification information 10011, and also manages a virtual/non-virtual status that is decided by the virtual/non-virtual management program 1010 on the basis whether the hypervisor or the OS is included in Resource Pool or Service Resource.

In the initial state of the virtual/non-virtual management information 1001, although the physical server identification information is specified and, if OS has already introduced before shipment, the OS information is specified, other items are not specified and given "Unassigned" or "Null". How to specify the attribute of a virtualization base and the attribute of OS, and how to decide a virtual/non-virtual status will be described later.

In the above example, although the virtual/non-virtual management information 1001 is specified per physical server, the virtual/non-virtual management information 1001 can be specified per LPAR (logical partition) that is a part obtained by logically dividing a physical server. In this case, not only the physical server information 10011, but also LPAR identification information has to be managed.

In addition, with the use of an SMP (symmetric multiprocessor) function that enables all the CPUs of plural blade servers coupled to each other via a bus or the like to access memories with a constant speed, the virtual/non-virtual management information 1001 can be designated per plural blade servers. In this case, it is necessary that not only the physical server identification information but also identification information regarding the plural blade servers is managed. It is necessary that all the physical servers configured in the SMP configuration have the same virtual/non-virtual status.

FIG. 5 and FIG. 6 are diagrams showing configuration examples of the infrastructure monitoring item information 1002 stored by the management computer. The infrastructure manager manages items that he/she has to manage among items that can be monitored with the use of the physical server monitoring program, the storage monitoring program, a network monitoring program, and the virtual environment monitoring program.

In the column monitoring target 10011, items that are monitoring targets to be monitored, for example, a server and a storage are recorded. In the column type 10012, categories are recorded, and in the column monitoring item 10013, monitoring items are recorded. FIG. 6 shows examples of items that the infrastructure has to manage in the case where virtual software is running.

FIG. 5 and FIG. 6 show the infrastructure monitoring item management information that manages all the monitoring items that all the monitoring programs of the management computer can monitor, and monitored results are stored in the monitoring information 1006. In the first embodiment, it will be assumed that all the monitored data recorded in the infrastructure monitoring item management information are stored in the monitoring information 1006.

FIG. 7 is a diagram showing a configuration example of user manager monitoring item management information 1003 stored by the management computer.

The relationship between items that the user manager has to manage and infrastructure monitoring items is managed by this management information. Information regarding the column relevant infrastructure monitoring item in FIG. 7 is obtained from the infrastructure monitoring item information in FIG. 5 or FIG. 6. Thanks to the management of the virtual/non-virtual status 10032 performed by this management information shown in FIG. 7, the infrastructure manager can provide the user manager with appropriate information.

As for the column virtual/non-virtual status shown in FIG. 7, the monitoring item management program decides whether the status of a server that is a monitoring target is virtual or non-virtual on the basis of the virtual/non-virtual management information. In the case where the status of the server is virtual, it is necessary for the user manager to configure items that is needed to create a virtual computer for an end-user as monitoring items. In this case, information whether a virtual environment is available or not, the configuration information and usage status of a hypervisor are needed. In addition, for the deployment of the virtual computer, the information of available templates and the usage statuses of virtual machines are also needed.

Hereinafter, the difference between the infrastructure monitoring items and the user manager monitoring items will be described. FIG. 6 shows the infrastructure monitoring item management information used for the infrastructure manager to monitor a virtual environment; therefore, the infrastructure manager has to manage as far as hardware information while the user manager only has to manage a virtualization layer. In addition, running information is information about whether the hypervisor is running or not, and the user manager does not have to know detailed running information about the infrastructure shown in FIG. 6. For example, if the hypervisor and the file system are in a connected state, because the user manager has only to inform the end-user of the relevant service being running, "Running" is displayed. If only at least one of the hypervisor and the file system is not in the connected state, because the user manager has only to inform the end-user of the relevant service being not running, "Not Running" is displayed. In the case where the status of the server is non-virtual, it is necessary for the user manager to configure items that is needed to deploy a physical computer for the end-user as monitoring items. The user manager obtains the specifications of the physical computer, such as the number of CPU cores and the disk capacity, and image information used for the deployment in order to perform bare metal deployment. Here, as for information about the usage status in the non-virtual environment, the user manager does not obtain information from the infrastructure monitoring item management information shown in FIG. 5 and FIG. 6 because the user manager obtains the information with the use of a monitoring tool introduced by him/her on his/her own.

FIG. 8 is a diagram showing a configuration example of image management information stored by the management computer. The image information is management information that is stored by the management computer and used when the user manager performs bare metal deployment. The image management information shows that the user manager performs the bare metal deployment with the use of a server recorded in the column physical server identification information 10041 and an image recorded in the column image identification information 10042.

FIG. 9 is a diagram showing a configuration example of monitoring pattern management information stored by the management computer. The monitoring pattern management information manages the correspondence relation between a server recorded in the column server identification information in FIG. 9 and a pattern recorded in the column monitoring item management identification information in FIG. 7. Here, the correspondence relation between 10051 and 10052 can be also obtained from service management information; therefore, it is all right that only the correspondence relation between 10052 and 10053 is managed in the monitoring pattern management information.

FIG. 10 is a diagram showing a configuration example of the service management information stored by the self-service portal. In order to manage which server is provided for which user manager, the self-service portal stores servers registered in the column server identification information 20011 and information about users registered in the column server user 20013 on a one server-to-one user basis. In addition, the self-service portal manages which servers on the infrastructure side are provided by associating the server identification information 20011 with the server infrastructure identification information 20012. Here, the user manager does not need to know the infrastructure information, it is not necessary to display the server infrastructure identification information 20012 on the operation screen 2014.

FIG. 11 is a diagram showing an example of monitoring information for virtual environment stored by the self-service portal. The monitoring information for virtual environment is displayed by the monitoring item display program on the basis of the monitoring item management information shown in FIG. 7, and the monitoring information for virtual environment is displayed in the case where a virtual environment is provided for a user manager. The user manager can browse the monitoring information via the operation screen 2014 of the self-service portal.

The name of a server that is lent to the user manager is displayed in the column "Server Identification Information" 20021, and monitoring results relevant to the server are displayed in the columns "Running Status" 20022, "Usage Status" 20023 ("CPU Usage Rate" 20025, and "File System Free Capacity" 20026), and "Virtual Computer Information" 20024 ("Virtual Computer Identification Information" 20027, "Memory Capacity" 20028, and "Virtual Disk Capacity" 20029). Although items recorded in the column "Server Identification Information" 20021 respectively correspond to serial numbers recorded in the infrastructure monitoring items of the management computer and the like on a one-to-one basis, it is all right that the items are provided, for example, with "Server 1" by the service management program of the self-service portal so that the user manager can easily identify the items. In addition, it is conceivable that the template information recorded in available template identification information 20020 is stored in a template library exclusively created or the like.

The user manager can deploy or operate a virtual machine with the use of this template information.

FIG. 12 is a diagram showing the monitoring information for non-virtual environment stored by the self-service portal. The monitoring information for non-virtual environment is displayed by the monitoring item display program on the basis of the monitoring item management information shown in FIG. 7, and the monitoring information for non-virtual environment is displayed in the case where a non-virtual environment is provided for the user manager. The user manager can browse the monitoring information via the operation screen 2014 of the self-service portal.

The name of a server that is lent to the user manager is displayed in the column "Server Identification Information" 20031, and monitoring results relevant to the server are displayed in the columns "Running Status" 20032, "Usage Image" 20033, and "Specification" 20024 ("Number of CPU Cores" 20035, "Memory Capacity" 20036, "Disk Capacity" 20037, "Disk Type" 20038). Although items recorded in the column "Server Identification Information" 20031 respectively correspond to serial numbers recorded in the infrastructure monitoring items of the management computer and the like on a one-to-one basis, it is all right that the items are provided, for example, with "Server 1" by the service management program of the self-service portal so that the user manager can easily identify the items.

In addition, it is conceivable that the image information recorded in available image identification information 20039 is stored in an image library exclusively created or the like.

The user manager can perform bare metal deployment with the use of the image information.

Figure 13:
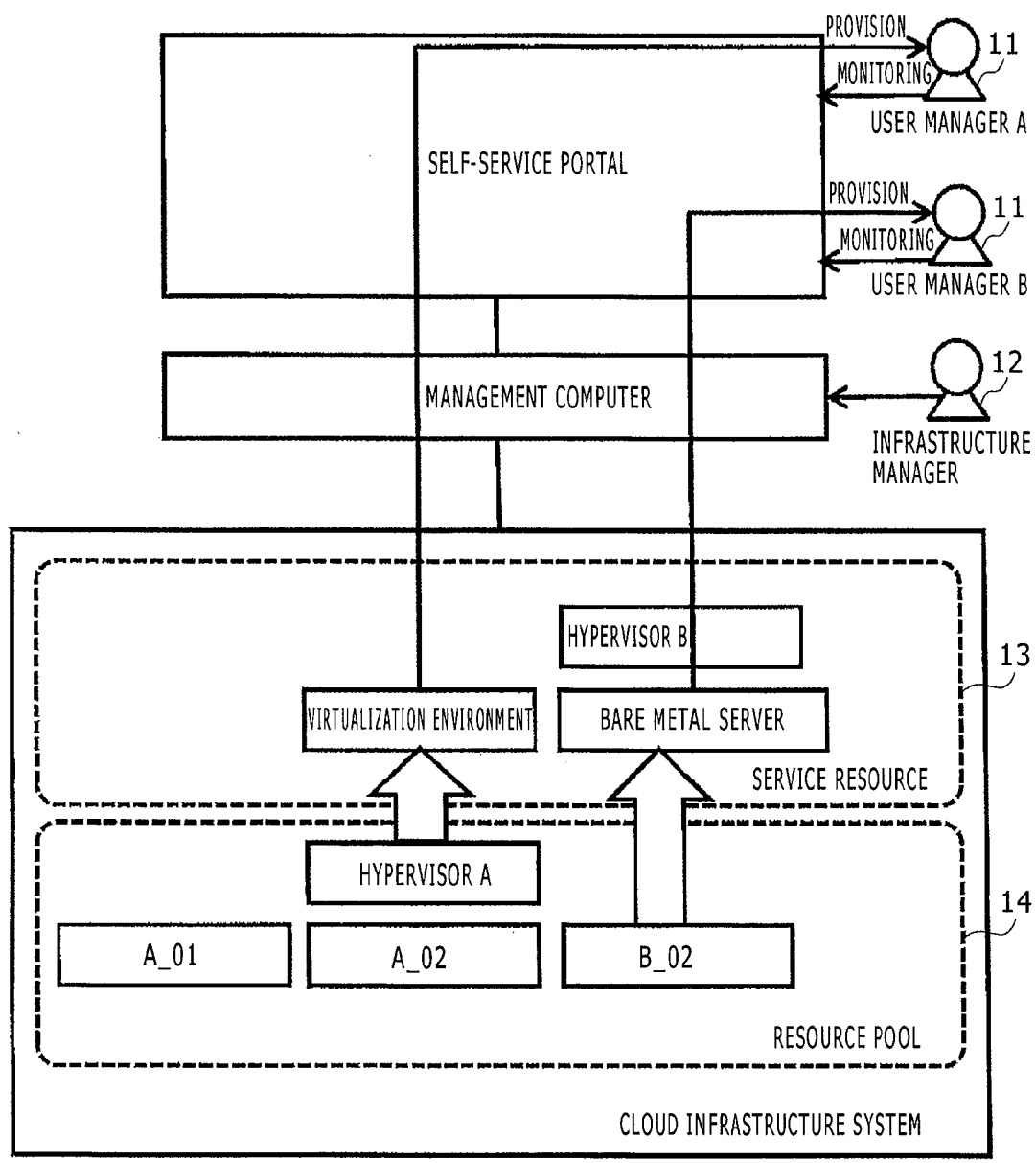
FIG. 13 is a block diagram showing the logical configuration of Service Resource and Resource Pool.

FIG. 13 is a diagram showing the monitoring system performed by an infrastructure manager and user managers and an example of the logical configuration of Service Resource and Resource Pool. The user managers perform the deployment of a virtual computer or a physical computer in a service resource environment via a self-service portal. In addition, Service Resource is monitored via the self-service portal by the user managers. The infrastructure manager performs the monitoring of Resource Pool via a management computer.

A Resource Pool member is provided for the infrastructure manager, and it is introduced when a cloud infrastructure is introduced, for example, before shipment. On the other hand, a service resource member is provided for the user managers, therefore it will be assumed that the service resource member is registered, for example, when a user manager requests the service resource member.

A physical computer "A_01" belongs to Resource Pool, but has not been provided for any user manager yet. In addition, as for "A_02", "Hypervisor A" is introduced into "A_02" before "A_02" becomes a target for the infrastructure manager to monitor, for example, before shipment. In other words, "A_02" and "Hypervisor A" belong to Resource Pool. Therefore, a hypervisor environment, which is included in Service Resource and virtualized, is provided for a user manager A. OS is not introduced into "B_02" for the infrastructure manager, and "B_02" is provided for Service Resource as a bare metal server. Therefore, the bare metal server included in Service Resource is provided for a user manager B. Because "Hypervisor A" on "B_02" is introduced by the user manager, "Hypervisor A" is included in Service Resource.

Figure 14:
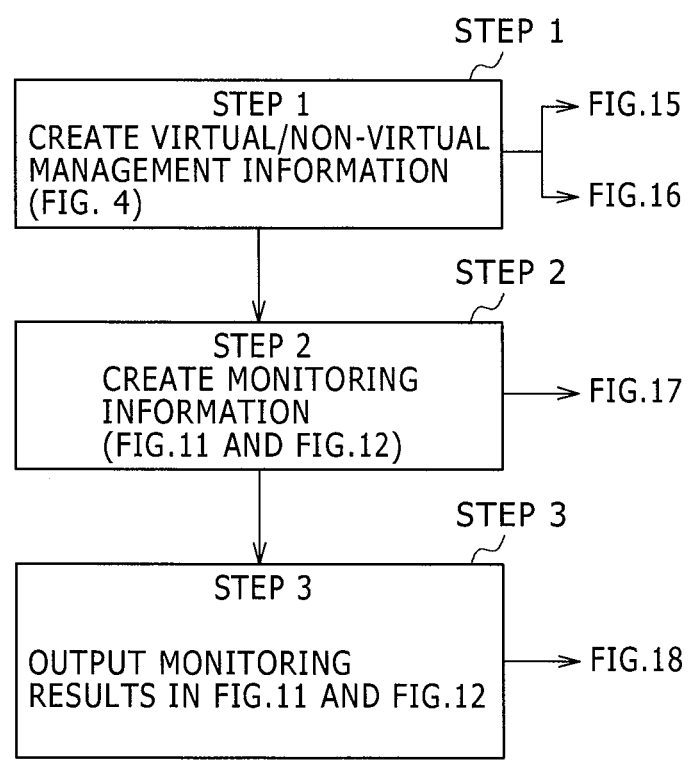
FIG. 14 is a flowchart showing the entire processing procedure of the cloud system.

FIG. 14 is a flowchart showing the entire flow of the present invention. To put it concretely, the virtual/non-virtual management information (shown in FIG. 4) is created in FIG. 15 and FIG. 16 (at Step 1). Next, it is judged whether the virtual/non-virtual status of the designated server is virtual or non-virtual on the basis of FIG. 4, and the monitoring information (shown in FIG. 11 and FIG. 12) that are monitored by user managers is created (at Step 2). In addition, the monitoring items regarding the monitoring information are output in FIG. 18 (at Step 3).

Although the following descriptions will be made about an example in which a physical server is designated in FIG. 15 to FIG. 18, a unit to be designated should be a unit that provides a service resource member, and if a unit that provides a service resource member is an LPAR or an SMP, a unit to be designated should be the LPAR or the SMP.

Figure 15:
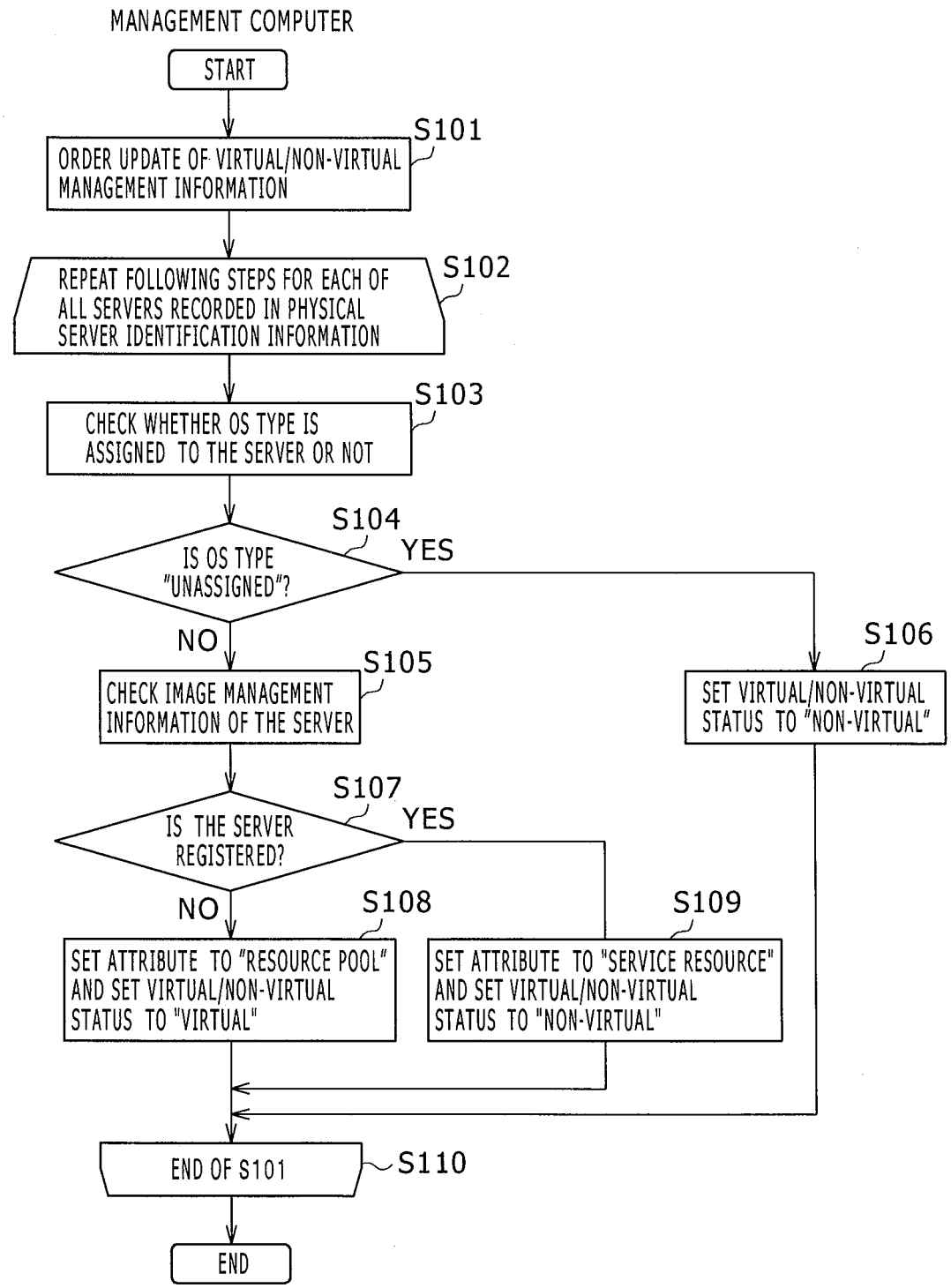
FIG. 15 is a flowchart showing a processing procedure for managing a virtual environment and a non-virtual environment.
Figure 16:
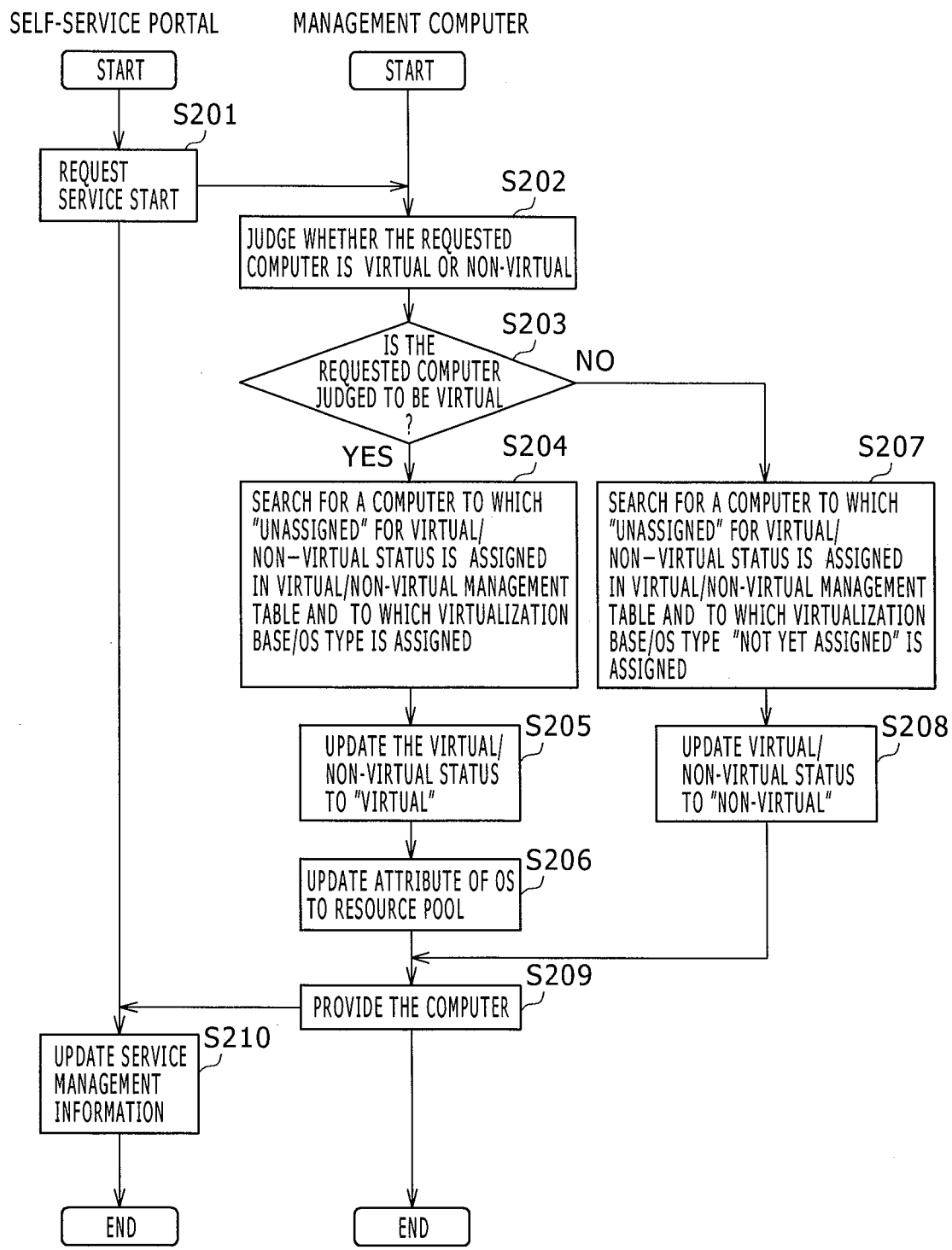
FIG. 16 is a flowchart showing a processing procedure for managing the virtual environment and the non-virtual environment.

FIG. 15 and FIG. 16 show flowcharts regarding the virtual/non-virtual management. Although an example of virtual/non-virtual management processing, in which a virtual/non-virtual status of a virtual server is given after a cloud infrastructure is introduced, will be performed as shown in FIG. 15 and FIG. 16, it is conceivable that another example of virtual/non-virtual management processing, in which the virtual/non-virtual status of the physical server has already been configured, for example, by managing the virtual/non-virtual status of the physical server by the serial number or the IP address of the physical server before the cloud infrastructure is introduced, is performed.

FIG. 15 is a flowchart showing a processing procedure of virtual management and non-virtual management in cooperation with image management. Because information about the physical server and OS running on the physical server can be obtained with the use of a physical server monitoring program and a virtual environment monitoring program running on the management computer, how to obtain the attribute 10015 and the virtual/no-virtual status 10013 will be described on the assumption that the physical server identification information 10011 and the virtualization base/OS type 10014 have already been obtained. In addition, it will be assumed that all the physical servers that are targets for the infrastructure manager to monitor have already been registered in the physical server identification information.

The infrastructure manager orders the virtual/non-virtual management program to update the virtual/non-virtual management information (at Step s101). The virtual/non-virtual management program repeats the following steps for each of all the servers registered in the virtual/non-virtual management information (at Step s102). The virtual/non-virtual management program checks whether a virtualization base/OS type is assigned to the server or not (at Step s103). Whether the virtualization base/OS type is "Unassigned" or not is judged (at Step s104), and if the answer is "No", the virtual/non-virtual management program checks whether there is the image management information of the server in the image management information or not (at Step s105). If there is not the server identification information of the server is not registered as the result of the check (at Step S107), the virtual/non-virtual management program sets the attribute of the virtual/non-virtual management information of the server to "Resource Pool", and also sets the virtual/non-virtual status of the virtual/non-virtual management information of the server to "Virtual" (at Step s108).

If the server is registered in the image management information as the result of the check at Step s107, the virtual/non-virtual management program sets the attribute of the virtual/non-virtual management information of the server to "Service Resource", and also sets the virtual/non-virtual status of the virtual/non-virtual management information of the server to "Non-virtual" (at Step s109).

If the answer as the result of the check at Step s 104 is "Yes", the virtual/non-virtual management program sets the virtual/non-virtual status of the virtual/non-virtual management information to "Non-virtual" (at Step s106).

As an example of the case where the virtual/non-virtual management processing is performed in cooperation with the image management, it is conceivable that the virtual/non-virtual management processing is performed in cooperation with the bare metal deployment processing so that the virtualization base/OS information of the virtual/non-virtual management information is updated at the timing when an image is designated for a physical computer.

FIG. 16 shows a flowchart of a processing procedure for updating the virtual/non-virtual status at service resource registration in the case where a new physical computer is added to the cloud infrastructure system. It will be assumed that the virtual/non-virtual status of the virtual/non-virtual management information 1001 of the new physical computer is recorded as "Unassigned" by default, and it will be also assumed that, when a physical environment or a non-virtual environment is registered in Service Resource, the virtual/non-virtual status is recorded as "Virtual" or "Non-virtual".

A user manager requests service start via the self-service portal. On receiving the request of service start from the user manager, the service management program 2010 of the self-service portal requests the management computer to start service (at Step s201). It is conceivable that some usage cases, such as a case where high-performance OS is required, a case where a virtual machine is created and provided, are displayed on the operation screen of the self-service portal, and the user manager selects one of these cases. The virtual/non-virtual management program of the management computer that receives the service start request judges whether the requested computer is virtual or non-virtual (at Step s202). If the required computer is judged to be virtual (Yes at Step s203), the virtual/non-virtual management program searches for a computer to which "Unassigned" for the virtual/non-virtual status is assigned in the virtual/non-virtual management information and to which a virtualization base/OS type is assigned ("Unassigned" is not assigned) (at Step s204), and updates the virtual/non-virtual status of the server to "Virtual" (at Step s205). In addition, the attribute is updated to "Resource Pool" (at Step s206). If the required computer is judged to be non-virtual (No at Step s203), the virtual/non-virtual management program searches for a computer to which "Unassigned" for the virtual/non-virtual status is assigned in the virtual/non-virtual management information and to which a virtualization base/OS type is "Unassigned" (at Step s207), and updates the virtual/non-virtual status of the server to "Non-virtual" (at Step s208). The server provision program 1018 discloses the computer to the self-service portal (at Step s209). After Step s209, the service management program of the self-service portal updates the service management information (at Step s210).

Figure 17:
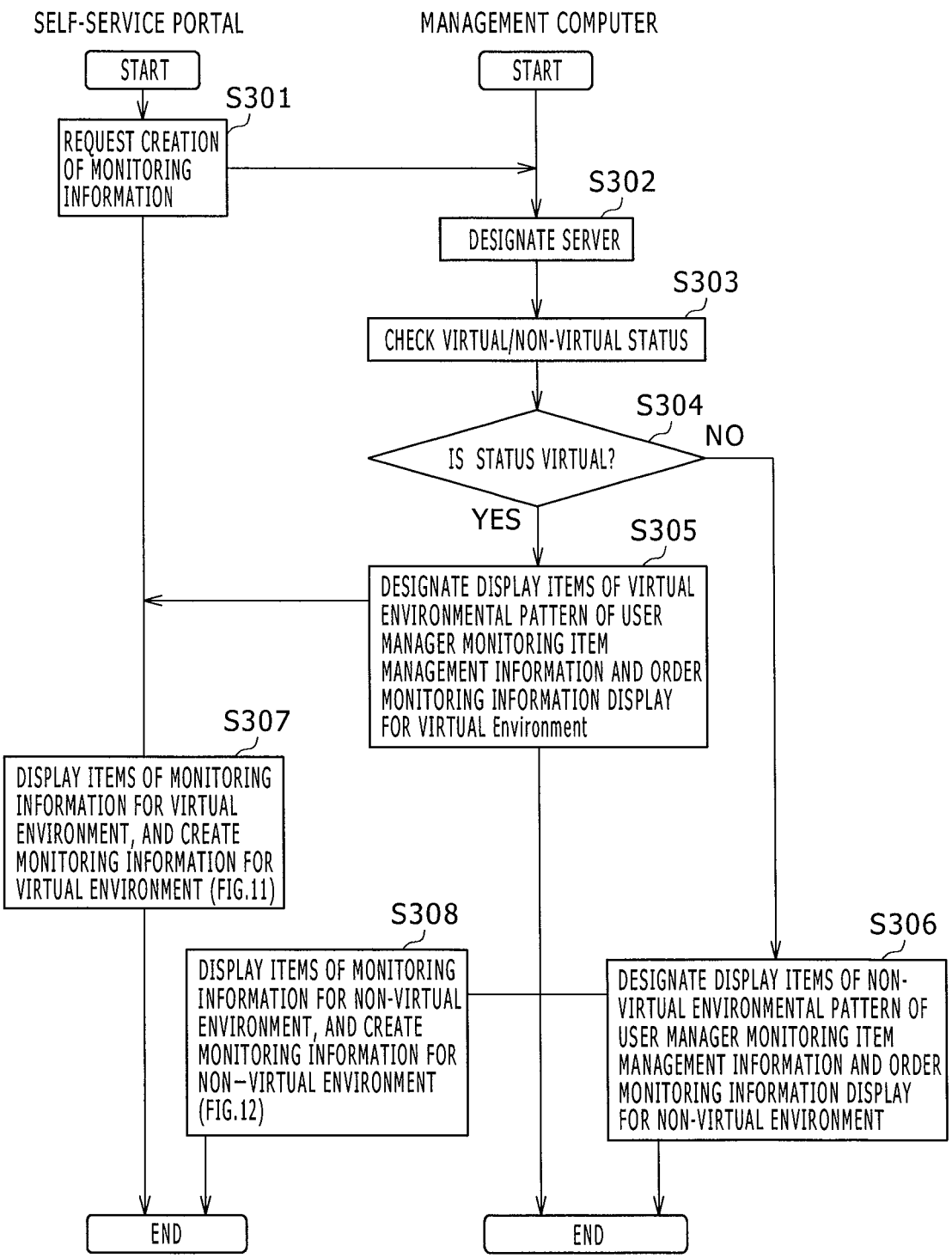
FIG. 17 is a flowchart showing a processing procedure for displaying user manager monitoring information.

FIG. 17 shows a flowchart of a processing procedure for creating the monitoring information for the user manager shown in FIG. 11 and FIG. 12. In this flowchart, monitoring items that should be obtained as monitoring information are selected among displayed items in FIG. 7 to create tables shown in FIG. 11 and FIG. 12. Because it is not managed whether a server lent to a user manager is virtual or non-virtual in the self-service portal, information about whether the server is virtual or non-virtual is obtained from the management computer. This processing procedure can be successively performed just after the service resource registration processing shown in FIG. 15.

The monitoring item display program of the self-service portal designates a server and requests the management computer to create monitoring information (at Step s301). On receiving the request, the monitoring item management program of the management computer designates the server (at Step s302). The virtual/non-virtual management program checks the virtual/non-virtual status of the server (at Step s303). If the virtual/non-virtual status is judged to be virtual (Yes at Step s304), the virtual/non-virtual management program designates display items with reference to the display items of a pattern whose virtual/non-virtual status is "Virtual" in the user manager monitoring item management information, and orders the self-service portal to display monitoring information for virtual environment (at Step s305). On receiving this order, the monitoring item display program of the self-service portal displays monitoring items for virtual environment, and creates monitoring information for virtual environment (at Step s307). If the virtual/non-virtual status is judged to be non-virtual (No at Step s304), the virtual/non-virtual management program designates display items with reference to the display items of a pattern whose virtual/non-virtual status is "Non-virtual" in the user manager monitoring item management information, and orders the self-service portal to display monitoring information for non-virtual environment (at Step s306). On receiving this order, the monitoring item display program of the self-service portal displays monitoring items for non-virtual environment, and creates monitoring information for non-virtual environment (at Step s308).

After Step s305 and Step s306, the monitoring item management program updates user manager monitoring item management information.

Thanks to the completion of the processing procedure shown in FIG. 17, a user manager can monitor appropriate information in both virtual and non-virtual environments.

Figure 18:
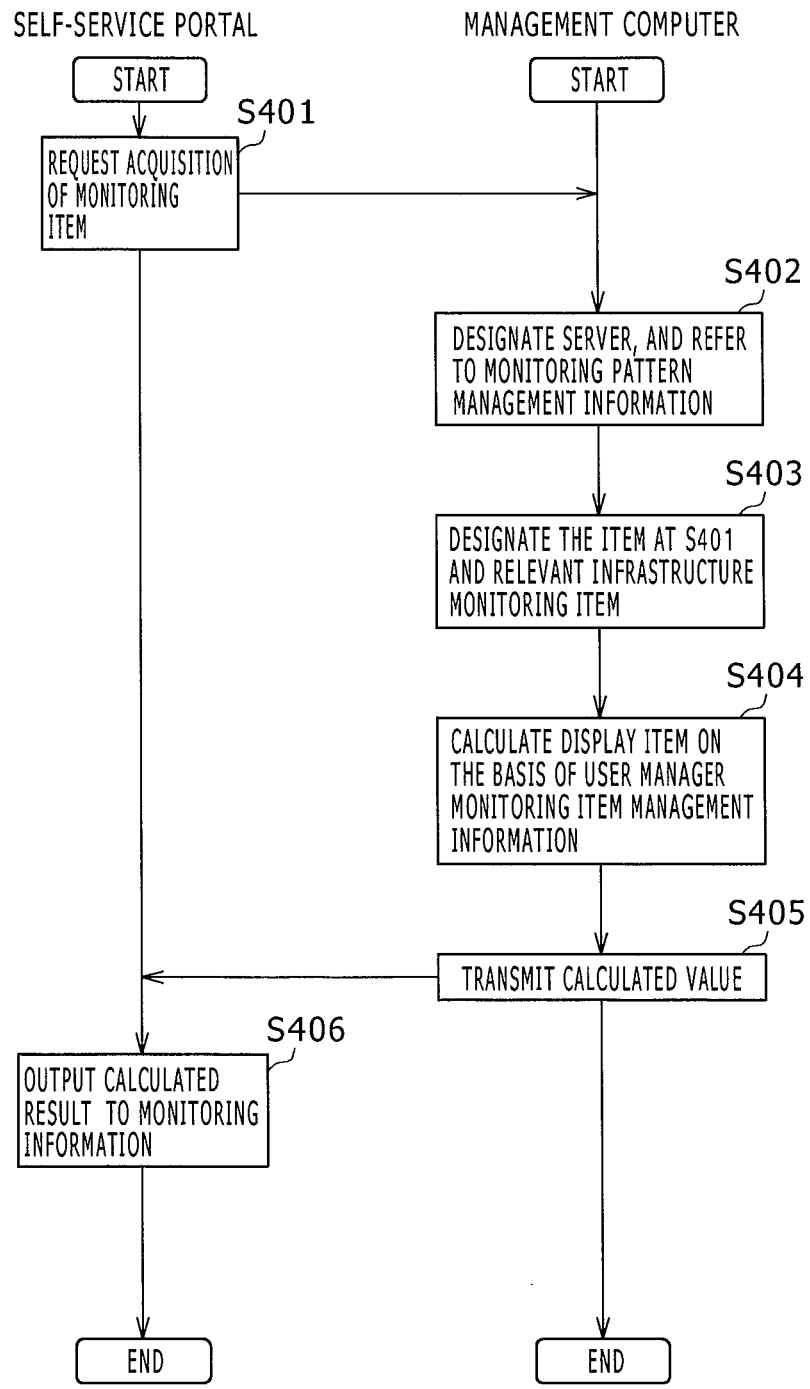
FIG. 18 is a flowchart showing a processing procedure for acquiring the user manager monitoring information.

FIG. 18 is a flowchart showing a processing procedure for acquiring user manager monitoring information in the virtual environment and outputting the acquired user manager monitoring information to the table created in FIG. 17.

This processing procedure can be successively performed just after the service resource registration processing procedure shown in FIG. 16.

The monitoring item display program of the self-service portal designate a server and a monitoring item, and request the management computer to acquire the monitoring item (at Step s401). On receiving the request, the monitoring item management program of the management computer designate the server, and refers to the monitoring pattern management information (at Step s402). The monitoring item management program designates the item designated at Step s401 among monitoring items with reference to the relevant pattern in the user manager monitoring item management information, and further designates the relevant infrastructure monitoring item corresponding to the item designated at Step s401 (at Step s403). With reference to the user manager monitoring item management information, the monitoring item management program calculates the value of the display item with the use of information that is acquired by monitoring programs 1011, 1012, and 1014 of the management computer and stored in the monitoring information 1006 (at Step s404). The monitoring item management program transmits the calculated value to the self-service portal (at Step S405). The monitoring item display program of the self-service portal, which receives the calculated value, outputs the acquired result to update the monitoring information (at Step s406).

Here, the above mentioned calculation processes can be materialized by hardware with the use of, for example, integrated circuits performing the equivalent calculation processes.

The same is equally true of the following embodiments.

Second Embodiment

A second embodiment will show an example in which plural file systems and hosts are provided when a virtual environment is provided as a service resource member. In this embodiment, it will be assumed that a user manager selects a volume or a host, or changes the load distribution setting in a cluster in accordance with his/her intended use application.

FIG. 19 shows service management information 2001 in the second embodiment. While a server is lent as a unit as shown in FIG. 10 in the first embodiment, a cluster or a disk is lent as a unit in the second embodiment.

FIG. 20 shows user manager monitoring item management information 1003 in the second embodiment. Information regarding the column relevant infrastructure monitoring item in FIG. 20 is obtained from the infrastructure monitoring item information in FIG. 5 or FIG. 6.

Because the user manager uses not only a designated host or disk, but also he/she selects a host or disk to use among plural hosts or disks, an infrastructure manager provides the user manager with disk information and cluster information in addition to information regarding FIG. 7. The user manager selects a disk to use, or set the threshold used for the load distribution setting in the cluster on the basis of these pieces of information.

In the user manager monitoring item information display processing, whether the first embodiment (the virtual environment pattern 1 shown in FIG. 7) is applied or the second embodiment (the virtual environment pattern 2 shown in FIG. 20) is applied can be judged on a component or components assigned to the user manager in the service management information. For example, if only servers are provided as shown in FIG. 10, the virtual environment pattern 1 is applied, and if a cluster and disks are provided as shown in FIG. 19, the virtual environment pattern 2 is applied.

Third Embodiment

In the first embodiment, an exemplary example, in which the infrastructure manager acquires all the items registered in the infrastructure monitoring item management information, and the acquired items are stored in the monitoring information 1006, has been shown. However, the acquisition of all the monitoring items as above imposes a significant load on the cloud system. In addition, there is a problem in that, the more monitoring items there are, the more man-hours are imposed on the infrastructure manager.

As a result of taking the above things into consideration, an example, in which necessary and sufficient items are shown to the infrastructure manager, and at the same time, necessary and sufficient items are shown to a user manager, is proposed in a third embodiment. The following processing procedure is performed at constant intervals, so that monitoring items that are shown to the user manager are not shown redundantly to the infrastructure manager. In addition, it will be assumed that, if any failure occurs in hardware, the infrastructure manager has to repair the failure, so that the infrastructure manager has to obtain the running information and hardware information in the column "Type" of the infrastructure monitoring item management information 1002 regardless of whether the user manager monitors the running information and hardware information or not.

Figure 21:
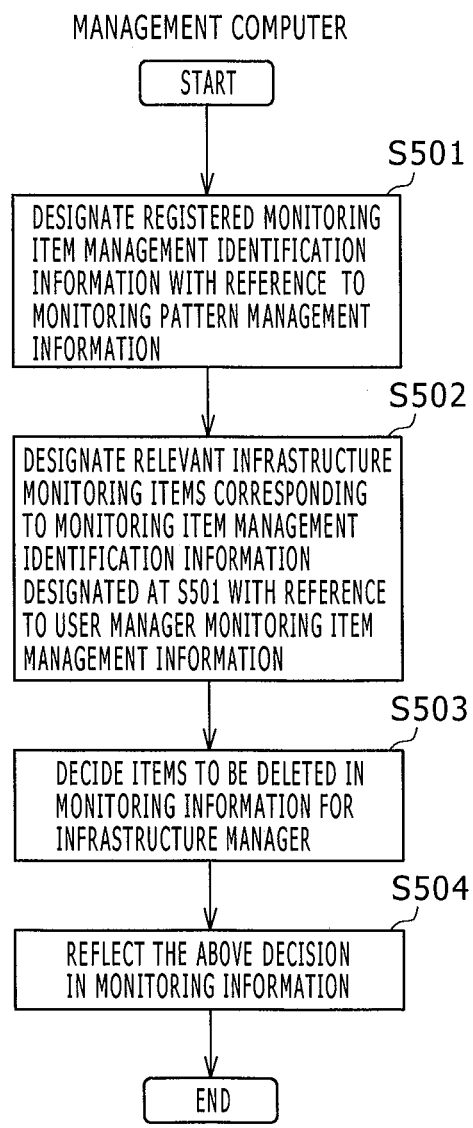
FIG. 21 is a flowchart showing a processing procedure for configuring infrastructure manager monitoring items.

FIG. 21 is a flowchart showing processing for configuring the infrastructure manager monitoring items. This processing can be performed at constant intervals, or can be performed at the timing when the monitoring pattern management information shown in FIG. 9 is updated. The infrastructure manager monitoring items are designated in a unit of a provided service resource member; therefore they are designated in a unit of a physical server, in a unit of an LPAR, or in a unit of an SMP in accordance with the hardware configuration of the service resource member.

The monitoring item management program of the management computer, designates the monitoring item management identification information of the designated identification information with reference to the monitoring pattern management information 1005 (at Step S501). The monitoring item management program designates the relevant infrastructure monitoring items corresponding to the monitoring item management identification information with reference to the user manager monitoring item management information (at Step s502). The monitoring item management program designates the above-designated monitoring items except for monitoring items whose types belong to "Running Information" and "Hardware Information", and judges that these designated monitoring items are items to be deleted from the monitoring information 1006 (at Step s503). The monitoring item management program deletes these designated items from the monitoring information 1006 (at Step S504). The monitoring programs 1011 to 1014 obtain only information recorded in these monitoring items of this monitoring information.

Switching between the operation of the first embodiment and the operation of the third embodiment can be performed in cooperation with the accounting system of the self-service portal. For example, in cooperation with the accounting system, the first embodiment can be used to provide a more reliable and higher-class system which enables an infrastructure manager to monitors all items.

Although the above descriptions have been made on the assumption that the management computer, the self-service portal, and the like execute programs residing in memory, it is also conceivable that programs introduced in the management computer or the self-service portal perform the above-mentioned pieces of processing. Alternatively, programs that have been stored in a computer or an external storage device in advance perform the above-mentioned pieces of processing, or these programs can be introduced into an external storage device as needed via a removable storage medium or communication media (such as a wire network, a wireless network, an optical network, or carrier waves and digital signals transmitted through these networks).

What is claimed is:

1. A computer system comprising:
a management computer;
a self-service portal; and
a cloud infrastructure system having physical computers and a storage device, the management computer, the self-service portal, and the cloud infrastructure system being coupled to each other,
wherein the management computer;
includes:
a memory,
virtual/non-virtual management information, stored in the memory, including identifiers of the physical computers and virtual/non-virtual statuses that show whether usage modes of the physical computers provided by an infrastructure manager are virtual environments or non-virtual environments, and
user manager monitoring item management information, stored in the memory, including the virtual/non-virtual statuses and monitoring items output by the self-service portal on a basis of the virtual/non-virtual statuses;
receives a designation of one of the physical computers as a monitoring target from the self-service portal;
makes a judgment whether a usage mode of the designated physical computer is non-virtual or virtual with reference to the virtual/non-virtual management information;
specifies monitoring items to be monitored regarding the designated physical computer with reference to the user manager monitoring item management information; and
transmits the specified monitoring items to the self-service portal,
wherein the self-service portal outputs the specified monitoring items.

2. The computer system according to claim 1,
wherein the virtual/non-virtual management information further includes type information that shows whether an operating system (OS) or a virtualization base is installed in the designated physical computer or not and, if installed, a type of the installed OS or virtualization base, wherein the management computer further stores image management information that includes an identifier of the designated physical computer and an image information of the designated physical computer, and wherein the judgment is decided on the basis of whether OS or a virtualization base is installed in the designated physical computer or not and, if installed, whether there is the image information of the installed OS or the image information of the installed virtualization base or not with reference to the type information and the image management information.

3. The computer system according to claim 2, wherein the judgment is decided in such a way that,
in a case where the OS or the virtualization base is not installed in the designated physical computer, the virtual/non-virtual status is judged to be non-virtual;
in a case where the OS or the virtualization base is installed in the designated physical computer and there is the image information of the installed OS or the image information of the installed virtualization base, the virtual/non-virtual status is judged to be non-virtual; and
in case where the OS or the virtualization base is installed in the designated physical computer and there is no image information of the installed OS nor the installed virtualization base, the virtual/non-virtual status is judged to be virtual.

4. The computer system according to claim 3, wherein, when a new physical computer is added to the cloud infrastructure system, the management computer sets a virtual/non-virtual status and a type information of the virtual/non-virtual management information of the added physical computer to "Unassigned", and updates the virtual/non-virtual status and the type information by changing the virtual/non-virtual status and the type information to "Virtual" or "Non-virtual" on the basis of the judgment.

5. The computer system according to claim 4, wherein the self-service portal:
receives the usage mode of the designated physical computer from the management computer;
creates monitoring information for virtual environment or monitoring information for non-virtual environment that are specified for the usage mode; and
extracts the specified monitoring items from the monitoring information for virtual environment or the monitoring information for non-virtual environment, and outputs the extracted monitoring items.

6. The computer system according to claim 5, wherein the monitoring information for virtual environment includes: a CPU usage rate and a free capacity of a file system of the virtualization base running on the designated physical computer; and a memory capacity and a virtual disk capacity of a virtual computer running on the virtualization base.

7. The computer system according to claim 6, wherein the monitoring item information for the non-virtual environment includes a number of CPU cores, the memory capacity, a disk capacity and a disk type of the designated physical computer.

8. A management computer that is coupled to a self-service portal and a cloud infrastructure system having physical computers and a storage device, the management computer:
includes:
a memory,
virtual/non-virtual management information, stored in the memory, including identifiers of the physical computers and virtual/non-virtual statuses that show whether usage modes of the physical computers provided by an infrastructure manager are virtual environments or non-virtual environments, and
user manager monitoring item management information, stored in the memory, including the virtual/non-virtual statuses and monitoring items output by the self-service portal on a basis of the virtual/non-virtual statuses;
receives a designation of one of the physical computers as a monitoring target from the self-service portal;
makes a judgment whether a usage mode of the designated physical computer is virtual or non-virtual with reference to the virtual/non-virtual management information;
specifies monitoring items to be monitored regarding the designated physical computer with reference to the user manager monitoring item management information; and
transmits the specified monitoring items to the self-service portal as monitoring items regarding the designated physical computer.

9. The management computer according to claim 8, further including image management information that includes an identifier of the designated physical computer and an image information of the designated physical computer, wherein the virtual/non-virtual management information further includes type information that shows whether an operating system (OS) or a virtualization base is installed in the designated physical computer or not and, if installed, a type of the installed OS or virtualization base, and wherein the judgment is decided on the basis of whether the OS or a virtualization base is installed in the physical computer or not and, if installed, whether there is the image information of the installed OS or the image information of the installed virtualization base or not with reference to the type information and the image management information.

10. The management computer according to claim 9, wherein the judgment is decided in such a way that,
in a case where the OS or the virtualization base is not installed in the designated physical computer, the virtual/non-virtual status is judged to be non-virtual;
in the case where the OS or the virtualization base is installed in the designated physical computer, and there is the image information of the installed OS or the image information of the installed virtualization base, the virtual/non-virtual status is judged to be non-virtual; and
in the case where the OS or the virtualization base is installed in the designated physical computer, and there is not the image information of the installed OS nor the image information of the installed virtualization base, the virtual/non-virtual status is judged to be virtual.

11. The management computer according to claim 10, wherein, in case where a new physical computer is added to the cloud infrastructure system, the management computer
sets the virtual/non-virtual status of the virtual/non-virtual management information of the added physical computer to "Unassigned", and
updates the virtual/non-virtual status by changing the virtual/non-virtual status from "Unassigned" to "Virtual" or "Non-virtual" on the basis of the judgment.

12. A method for controlling monitoring items regarding a computer system including a self-service portal; a cloud infrastructure system having physical computers and a storage device; and a management computer having virtual/non-virtual management information, stored in the memory of the management computer, including identifiers of the physical computers and virtual/non-virtual statuses that show whether usage modes of the physical computers provided by an infrastructure manager are virtual environments or non-virtual environments, and user manager monitoring item management information, stored in the memory, including the virtual/non-virtual statuses and monitoring items output by the self-service portal on a basis of the virtual/non-virtual statuses, the self-service portal, the cloud infrastructure system, and the management computer being coupled to each other, the method for controlling monitoring items regarding the computer system comprising:

transmitting a designation of one of the physical computers as a monitoring target from the self-service portal to the management computer;

making a judgment, by the management computer, whether a usage mode of the designated physical computer is non-virtual or virtual with reference to the virtual/non-virtual management information;

specifying monitoring items to be monitored regarding the designated physical computer with reference to the user manager monitoring item management information;

transmitting the specified monitoring items from the management computer to the self-service portal, and outputting the specified monitoring items.

13. The method for controlling monitoring items according to claim 12, wherein the virtual/non-virtual management information further includes type information that shows whether an operating system (OS) or a virtualization base is installed in the physical computer or not and, if installed, a type of the installed OS or virtualization base, wherein the management computer further includes image management information that includes an identifier of the designated physical computer and image information of the designated physical computer, and wherein the judgment is decided on the basis of whether the OS or the virtualization base is installed in the designated physical computer or not and, if installed, whether there is the image information of the installed OS or the image information of the installed virtualization base or not with reference to the type information and the image management information.

14. The method for controlling the monitoring items according to claim 13, wherein the judgment is decided in such a way that, in a case where the OS or the virtualization base is not installed in the designated physical computer, the virtual/non-virtual status is judged to be non-virtual;

in a case where the OS or the virtualization base is installed in the designated physical computer, and there is the image information of the installed OS or the image information of the installed virtualization base, the virtual/non-virtual status is judged to be non-virtual; and in a case where the OS or the virtualization base is installed in the designated physical computer, and there is not the image information of the installed OS nor the image information of the installed virtualization base, the virtual/non-virtual status is judged to be virtual.

15. The method for controlling monitoring items according to claim 14, further comprising:

setting the virtual/non-virtual status of the virtual/non-virtual management information of a new physical computer to "Unassigned" in a case where the designated physical computer is added to the cloud infrastructure system; and updating the virtual/non-virtual status by changing the virtual/non-virtual status to "Virtual" or "Non-virtual" on the basis of the judgment.

16. The method for controlling the monitoring items according to claim 15, further comprising:

transmitting the usage mode of the designated physical computer from the management computer to the self-service portal;

creating monitoring information for virtual environment or monitoring information for non-virtual environment that are specified for the usage mode;

extracting the specified monitoring items from the monitoring information for virtual environment or the monitoring information for non-virtual environment; and outputting the extracted monitoring items.

17. The method for controlling the monitoring items according to claim 16, wherein the monitoring information for virtual environment includes:

a CPU usage rate and a free capacity of a file system of a virtualization base running on the designated physical computer; and a memory capacity and a virtual disk capacity of a virtual computer running on the virtualization base.

18. The method for controlling monitoring items according to claim 17, wherein the monitoring item information for non-virtual environment includes a number of CPU cores, the memory capacity, the disk capacity and disk type of the designated physical computer.

* * * * *